Dec. 7, 1965 V. A. FALCO 3,221,672
FOOD PRODUCT ASSEMBLY DEVICE
Filed March 6, 1963 2 Sheets-Sheet 1
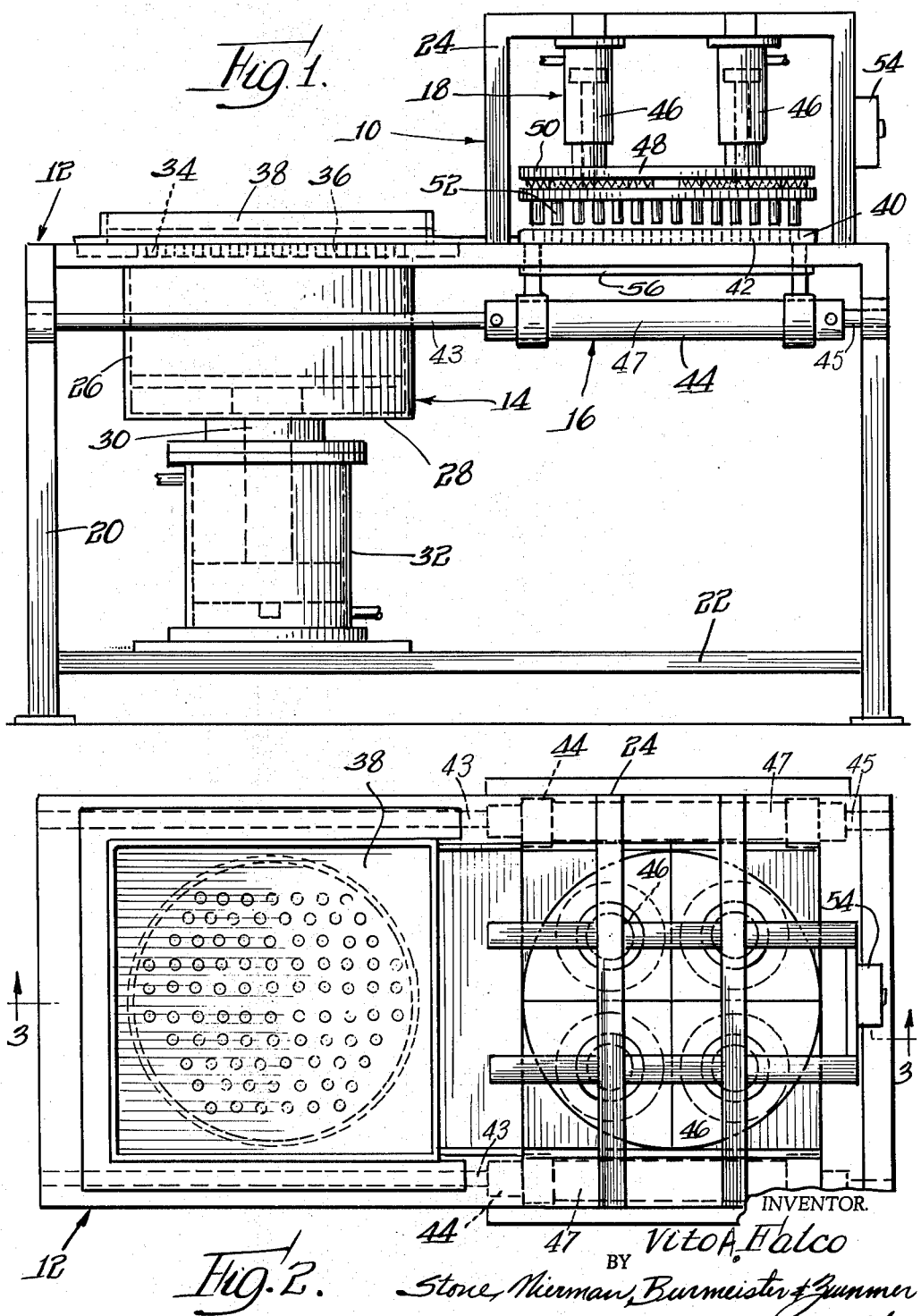
INVENTOR.
Vito A. Falco
BY Stone, Nieman, Burmeister & Gunner
Attys.

Dec. 7, 1965  V. A. FALCO  3,221,672
FOOD PRODUCT ASSEMBLY DEVICE
Filed March 6, 1963  2 Sheets-Sheet 2
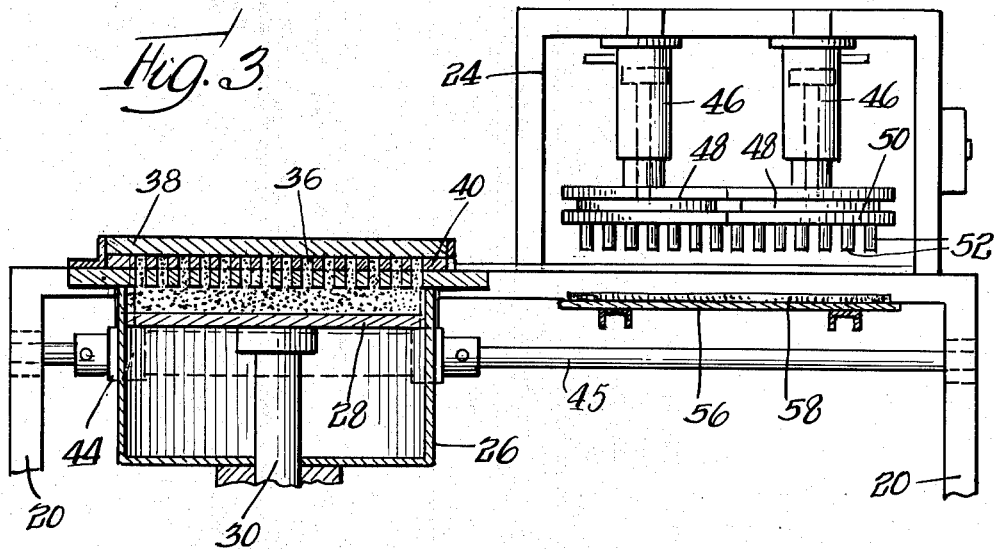
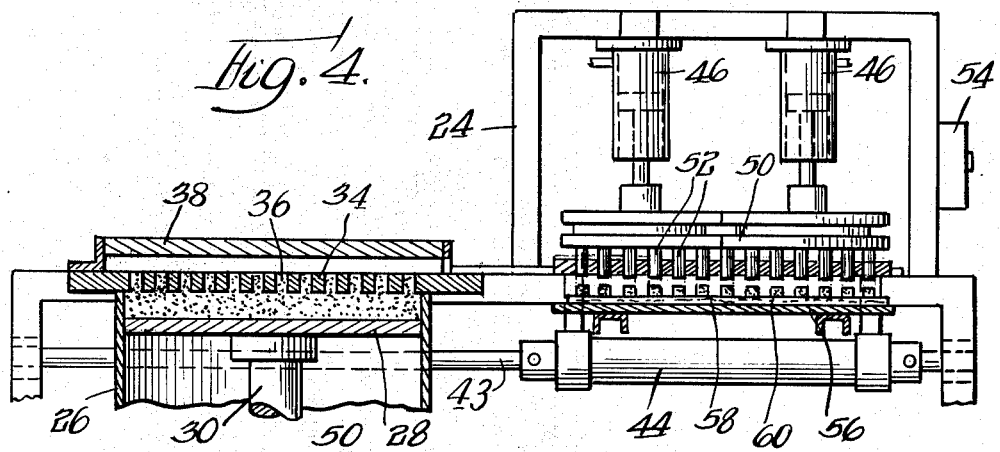
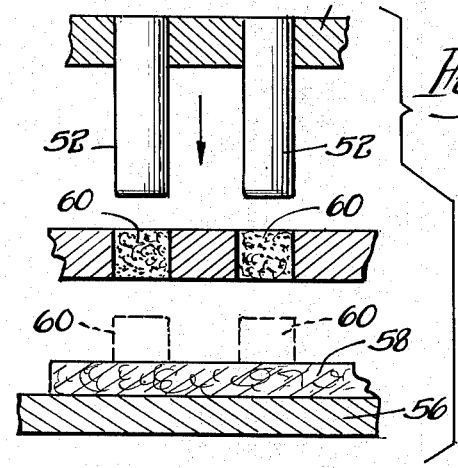
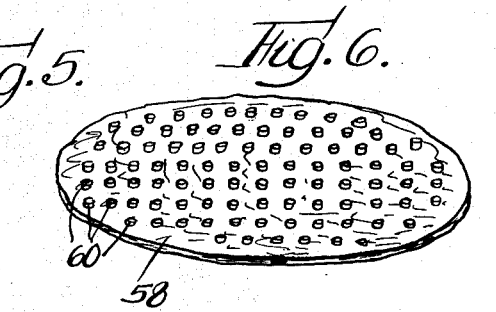
INVENTOR.
Vito A. Falco
BY Stone, Mierman
Burmeister & Zimmer attys.

3,221,672
FOOD PRODUCT ASSEMBLY DEVICE
Vito Antonio Falco, 5659 S. Sayre Ave., Chicago 38, Ill.
Filed Mar. 6, 1963, Ser. No. 263,252
5 Claims. (Cl. 107—1)

This invention relates to a food product assembly device, and more particularly, to a device for measuring and positioning a given food on another food to make up an assembled food product.

In the assembly of many food products, it is necessary to measure out a quantity of food and position it in relation to other foods in a given assembly for a food product. One of the food products which has been manufactured in a random manner is pizza pie. Pizza pie generally consists of a dough base with a form of tomatoes with cheese on top of the dough base. Variations of pizza pie are made by adding various foods on to the pizza pie. One of the foods which is often added is ground meat. Ordinarily, a cook sprinkles a quantity of meat on top of the mixture of cheese and tomatoes before the pizza pie is baked. It is apparent that sprinkling by hand results in the meat being non-uniformly distributed, so that in some cases, the meat is not entirely cooked if a particularly large piece of meat is dropped on a given point. Inasmuch as pizza pies are often shared by individuals, one individual may be disappointed by the lack of sufficient meat on his portion of the pizza pie while another has an excess of meat. In order to make certain that all portions of a pizza pie have sufficient meat, some cooks put an extra quantity of meat on the pizza pie, so that profits of the restaurant are decreased without a necessary increase in the quality of the pizza pie. It is, therefore, a principal object of this invention to provide a device for uniformly distributing meat on a pizza pie in a measured quantity.

It is another object of the instant invention to provide a device for measuring and positioning meat on a pizza pie with a minimum of effort and no application of skill on the part of a cook in the distribution of the meat.

It is a further object of the herein disclosed invention to provide a device for measuring and positioning meat on a selected portion of a pizza pie so that only a given portion of the pizza pie has meat positioned thereon and other foods may or may not be added to the remainder of the pizza pie.

Other objects and uses of the present invention will become readily apparent to those skilled in the art upon a perusal of the following specification in light of the accompanying drawings in which:

FIGURE 1 is a side elevation of a meat measuring and positioning device embodying the present invention;

FIGURE 2 is a plan view of the device shown in FIGURE 1;

FIGURE 3 is a cross sectional view taken on line 3—3 of FIGURE 2;

FIGURE 4 is a cross sectional view of the device as shown in FIGURE 3 but with a movable die located at an unloading station, and meat carried by the movable die being positioned on a pizza pie and fingers being shown in an unloading position;

FIGURE 5 is a cross sectional view of a portion of a movable die and a pair of fingers cooperative with the die; and FIGURE 6 is a perspective of a meat pizza pie showing the uniform distribution of meat on the pizza pie when assembled by the instant device.

Referring now to the drawings, and especially to FIGURE 1, a meat measuring and positioning device embodying the herein disclosed invention is generally indicated by numeral 10. The device 10 generally consists of a frame 12, a meat extruding assembly 14 mounted on the frame, a meat measuring and transporting assembly 16, and an unloading assembly 18.

The frame 12 is conventional in construction in that it includes four legs 20, a plurality of cooperative beam members 22 fixed to the legs. A super structure 24 is mounted on the legs and beam members for supporting the unloading assembly 18.

The extruding assembly 14 includes a tubular meat container 26 which has a generally cylindrical exterior with its axis in a vertical attitude. The container 26 has a piston 28 slideably mounted therein for forcing meat upward. The piston 28 has connected thereto a rod 30 of a pneumatic cylinder 32. The pneumatic cylinder 32 is conventional in construction and is controlled by a conventional valve which is not shown. Fixed to the upper end of the container 26 is a fixed die 34 which has a plurality of vertical holes 36 extending therethrough. Fixed above and spaced from the die is a retainer plate 38.

As was mentioned above, the transporting assembly 16 is cooperative with the extruding assembly 14. The transporting assembly includes a movable die 40 which is positionable in the space between the retainer plate and the fixed die. The movable die has a second plurality of holes 42 extending through the die. A portion of the holes 42 are registerable with a portion of the holes 36 in the fixed die. Attached to each side of the movable die is a conventional pneumatic double acting double rod die cylinder, each of which cylinders has a rod 43 fixed to one of the legs and a rod 45 fixed to the opposite leg so that a tube 47 fixed to the movable die slides on the rods 43 and 45. The die cylinders provide the means for transporting the movable die from the unloading station shown in FIGURE 1 to a position in the space between the fixed die 34 and the retainer plate 38.

Attached to the superstructure 24 is a means for unloading the die 40 at the unloading station. Four pneumatic finger cylinders 46, each having a heating element 48 attached thereto, are mounted on the superstructure. Attached to each heating element is a finger plate 50 with a plurality of fingers 52 secured to the plate. It should be noted that each of the cylinders is capable of moving independently its respective group of fingers 52. Valves of a well known construction (which valves are not shown herein) are connected to the finger cylinders to provide the necessary control for operating the cylinders individually or as a group. A rheostat 54 is connected to the heating elements 46 to regulate the amount of heat generated by the heating elements thereby controlling the temperature of the fingers. The fingers are registerable with the holes 42 of the movable die. It is evident that as the cylinders move the fingers down, the fingers enter the holes in the movable die to push out any material contained in the holes. A pie support 56 is mounted on the frame 12 below the fingers 52, so that material expelled from the movable die is positioned in a fixed relation on a food product 58 positioned on the support.

In operation, the container 26 is filled with ground meat. The food product 58, i.e., the base of a pizza pie which is the dough with tomatoes and cheese such as that shown in FIGURES 3 and 4, is positioned on the support 56. The movable die 40 is positioned in the space between the fixed die 36 and the retainer plate 38 as shown in FIGURE 3. It should be noted at this point that the fixed die and the movable die have two sets of holes which are not registerable simultaneously. That is, when one set of holes is in registry, the other set is not. It may be appreciated that one set of holes encompasses a smaller circle than the other so that one set is used for a small pizza pie while the other is used for a large pizza pie. With the holes of selected sets of the two dies in registry, air under pressure is applied to cylinder 26 to push the piston 28 upward, thereby pushing ground meat into a set of holes 36 of the fixed die 34. The die 34 directs the ground meat into a selected set of holes 42 of the movable die 40. As the piston 28 continues to move upward, the selected holes 42 of the movable die become filled. Since the retainer plate 38 is in engagement with the top side of the movable die, the meat is compacted into the holes. Since meat is substantially incompressible, a fixed quantity of meat is positioned in the movable die.

Next, the movable die is removed from the space between the fixed die and the retainer plate. It may be appreciated that since the movable die slides over the fixed die, there is a shearing action by which the meat is sheared off so that a fixed quantity of meat is carried away by the movable die. The pistons 44 move the movable die to the unloading station.

With the movable die at the unloading station, the cylinders 46 are activated. In the event it is desirable to have the entire base covered with meat, all four cylinders are activated so that all of the fingers 52 move downward mating with the holes 42 of the movable die. The fingers enter the movable die and expel the meat from the holes. It should be noted that the meat has a tendency to stick to the ends of the fingers. In this instance, the fingers are heated. The heat is sufficient to melt the grease in the meat so that the meat drops off the ends of the fingers due to gravity. The drop is quite short from the ends of the fingers to the pizza pie base 58. Thus, ground meat which is formed in clusters 60 has the clusters deposited in a fixed pattern. It may be seen in FIGURE 6 how the meat clusters 60 are uniformly distributed over the upper surface of the pizza pie base.

It may be further appreciated that once the pizza pie is completed with the meat uniformly spread over the entire upper surface of the pie, the pizza pie is then baked and the baking of the pizza pie causes the meat clusters 60 to break up. Thus, the pizza pie has a uniform quantity of meat uniformly distributed over its entire surface. Each person who has a piece of pizza pie then has his fair share of the pizza pie and each pizza pie has the same quantity of meat as each other pizza pie so that there may be high stanadrds of uniformity in the manufacture of pizza pie in a given establishment. Furthermore, a proprietor may control the amount of meat which is provided on each piece of pie. It may be appreciated that by varying the thickness of the movable die, either more or less meat may be added to a pizza pie. It is, of course, obvious that the size of the holes may also be increased or decreased proportionately varying the size of the clusters of meat.

Although a specific embodiment of the herein disclosed device has been shown and described herein, it is obvious that those skilled in the art may make various modifications and changes without departing from the spirit and scope of the invention as set forth in the appended claims. It is to be understood that the instant invention is limited only by the appended claims.

What is claimed is:

1. A device for measuring and positioning meat on a food product comprising, in combination, a tubular meat container for holding ground meat, a piston movably mounted in said container for moving the meat in the container, a fluid operated cylinder connected to the piston for moving the piston vertically in said container, a fixed die having a plurality of vertical holes attached to the upper portion of the container for directing meat from said container as said meat is forced up by said piston, a movable die having a second plurality of holes slideably engageable with the fixed die for receiving in said second plurality of holes ground meat forced out of the fixed die, a retainer plate engageable with the upper surface of the movable die for retaining meat in the movable die to measure the quantity of meat received in the movable die, a second fluid operated cylinder cooperative with the movable die to move the movable die parallel to the upper surface of the fixed die to cut meat extending into both dies to provide a measured portion of meat carried in each hole of the movable die, a plurality of fingers movably mounted above an unloading station for mating with the holes of the movable die to force out the measured quantity of meat contained in the movable die and position the meat at relatively predetermined locations on a food product, and a heating element connected to the fingers to heat the fingers for releasing meat from the fingers after the meat has been pushed out of the die.

2. A device for measuring and positioning meat on a food product comprising, in combination, a tubular meat container having an axis in a substantially vertical attitude, a piston associated with said meat container, a fluid operated cylinder connected to the piston for forcing meat out of the upper portion of the container, a fixed die fixed to the upper portion of the container and having a plurality of holes for directing meat out of said container, a movable die having a second plurality of holes slideably engageable with said fixed die for receiving in said second plurality of holes meat forced out of the fixed die, a retainer plate mounted above the container and engageable with the movable die for retaining meat as it is forced into the movable die, means for moving the movable die across the fixed die to cut off the meat in said die and moving the movable die to an unloading station, a plurality of fingers mateable with the holes in the movable die for forcing the meat out of the movable die, said plurality of fingers being positioned above the movable die and being divided into four substantially equal contiguous groups, means for individually moving each of the groups of fingers into the respective holes in the movable die for forcing a selected quantity of meat out of the movable die and positioning the meat in a predetermined pattern on a food product, and a heating element connected to the fingers to heat the fingers for releasing meat from the fingers after the meat has been expelled from the movable die.

3. A device for measuring and positioning meat on a food product comprising, in combination, a frame, a tubular meat container mounted on said frame with the axis of the container in a substantially vertical attitude, a piston slideably mounted in the container, a fluid operated cylinder mounted below the container in engagement with the piston for moving the piston upward to expel meat from the container, a fixed die having a plurality of holes for directing meat forced out of said container being attached to the container, a retainer plate mounted on said frame above the fixed die, a movable die having a second plurality of holes registerable with holes in the fixed die and being slideably engageable with the retainer plate and the fixed die for receiving meat from the fixed die and measuring the quantity of meat in the holes of the movable die, a pair of fluid operated die cylinders attached to opposite sides of the movable die for sliding the movable die relative to the fixed die to cut meat between said die and moving the movable die to an unloading station, a plurality of movable fingers mounted above the unloading station and mateable with the holes of the movable die for forcing meat out of the movable die, said plurality of fingers being divided into four substantially equal contiguous groups, means for individually moving each group of fingers into the respective holes of said movable die to expel a selected portion of meat from the die, a heating element connected to each group of fingers to heat the fingers for releasing meat from the fingers after the meat has been expelled from the movable die, and means for regulating the amount of heat supplied by the heating elements.

4. A device for measuring and positioning a food on a food product comprising, in combination, a frame, a food container mounted on said frame, a first die positioned adjacent to said food container, said die having a plurality of apertures contained therein, a movable die positionable adjacent to the first die, said movable die having a second plurality of apertures registerable with a portion of the plurality of apertures of said first die in one position and registerable with a second portion of the plurality of apertures in the first die in a second position, means for forcing food from the container through the first die and into apertures of the movable die, and a plurality of fingers mounted on the frame for forcing food out of the apertures of the movable die.

5. A device for measuring and positioning a food onto a food product comprising, in combination, a frame, a food container mounted on said frame, a first die mounted on said frame adjacent to said food container, said first die having a plurality of apertures contained therein, a movable die positionable adjacent to the first die, said movable die having a second plurality of apertures registerable with a portion of the plurality of apertures in said first die in one position and registerable with a second portion of the plurality of apertures in the first die in a second position, means for forcing food from the food container through the first die and into the apertures of the movable die, a plurality of fingers movably mounted on the frame, means for moving said plurality of fingers to expel food from the apertures in said movable die, and means for releasing food from the fingers.

References Cited by the Examiner

UNITED STATES PATENTS

| 2,185,174 | 1/1940 | Hendler | 17—32 |
| 2,814,921 | 12/1957 | Beerend | 17—32 X |

FOREIGN PATENTS 295,456  8/1928  Great Britain.

CHARLES A. WILLMUTH, *Primary Examiner.*